(12) United States Patent
Tanaka et al.

(10) Patent No.: US 6,531,222 B1
(45) Date of Patent: Mar. 11, 2003

(54) FINE HOLLOW GLASS SPHERE AND METHOD FOR PREPARING THE SAME

(75) Inventors: Masaharu Tanaka, Ichihara (JP); Hachiro Hirano, Ichihara (JP); Kenji Yamada, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 8 days.

(21) Appl. No.: 09/763,881

(22) PCT Filed: Jun. 28, 2000

(86) PCT No.: PCT/JP00/04249

§ 371 (c)(1),
(2), (4) Date: Feb. 28, 2001

(87) PCT Pub. No.: WO01/02314

PCT Pub. Date: Jan. 11, 2001

(30) Foreign Application Priority Data

Jun. 30, 1999 (JP) ............................................. 11-185698

(51) Int. Cl.⁷ ................................................. B32B 5/16
(52) U.S. Cl. ...................... 428/402; 428/406; 428/404; 501/39; 65/21.4
(58) Field of Search ................................. 428/402, 406, 428/404; 501/39; 65/21.4

(56) References Cited

U.S. PATENT DOCUMENTS

| 4,303,431 | A | * | 12/1981 | Torobin | 65/21.4 |
|---|---|---|---|---|---|
| 4,303,730 | A | * | 12/1981 | Torobin | 428/333 |
| 4,303,732 | A | * | 12/1981 | Torobin | 428/333 |
| 5,534,348 | A | * | 7/1996 | Miller | 428/402 |
| 5,738,718 | A | | 4/1998 | Mori et al. | 106/481 |
| 5,849,055 | A | | 12/1998 | Arai et al. | 65/17.3 |
| 6,048,470 | A | | 4/2000 | Nakahara et al. | 423/628 |
| 6,267,942 | B1 | | 7/2001 | Mori et al. | 423/338 |
| 6,342,293 | B1 | | 1/2002 | Nakahara et al. | 428/315.7 |

FOREIGN PATENT DOCUMENTS

| JP | 9-20526 | 1/1997 |
|---|---|---|
| JP | 9-124327 | 5/1997 |
| JP | 9-278484 | 10/1997 |

\* cited by examiner

Primary Examiner—Leszek Kiliman
(74) Attorney, Agent, or Firm—Oblon, Spivak, McClelland, Maier & Neustadt, P.C.

(57) ABSTRACT

It is an object of the present invention to provide hollow glass microspheres having particle properties of a low particle density and grain size properties of a sharp grain size distribution, having a high homogeneity and having such strength that they are less likely to fracture during processing. In the present invention, a glass material containing a foaming agent and containing $B_2O_3$ in an amount of from 9 to 20%, is subjected to wet grinding to obtain a slurry having an average particle size of at most 3 $\mu$m, droplets thereof are heated, to obtain hollow glass microspheres having an average particle size of at most 15 $\mu$m, a maximum particle size of at most 45 $\mu$m, a particle density of at most 0.5 g/cm³ and a grain size gradient of at most 2.

7 Claims, No Drawings

US 6,531,222 B1

FINE HOLLOW GLASS SPHERE AND METHOD FOR PREPARING THE SAME

TECHNICAL FIELD

The present invention relates to hollow glass microspheres and a process for producing them.

BACKGROUND ART

Hollow glass microspheres are commonly called glass microballoons (hollow bodies), have a low specific gravity as compared with a conventional filler, have heat resistance, pressure resistance and impact resistance, and thereby have such an effect that when used as a filler, they contribute to weight saving of a packed product and at the same time, improve physical properties of the packed product such as strength, dimensional stability and moldability.

Accordingly, they are widely used for weight saving of resin molding components for e.g. automobiles, portable electronic equipments or electric appliance, patty/sealing materials for repairing automobiles, buoyancy materials for ships, synthetic wood and artificial marble.

Further, they are materials which are expected to develop into various applications such as heat insulating materials, insulants and dielectric constant-lowering materials. Particularly, as applications which are expected to expand by micro-sizing, not only applications for resin molding components, but also heat insulating coatings for heat insulating applications, and wire coating materials and substrates for applications for lowering dielectric constant, are mentioned.

Accordingly, hollow glass microspheres are used for various purposes and along with expectation of their expansion, ones which are micro and have more excellent particle properties and grain size properties have been strongly required in recent years.

Hollow glass microspheres and their production processes are proposed in e.g. JP-B-49-37565, JP-A-58-156551 and JP-B-4-37017.

JP-A-58-156551 discloses a process of forming hollow borosilicate glass microspheres, which comprises melting materials such as $SiO_2$, $H_3BO_3$, $CaCO_3$, $Na_2CO_3$, $NH_4H_2PO_4$ and $Na_2SO_4$ at a high temperature of at least 1000° C. to form glass containing a sulfur component in a large amount, dry-grinding the glass, followed by classification, and dispersing and retaining impalpable glass powder thus obtained in flame so as to foam the sulfur component as a foaming agent component. However, with respect to physical properties of the hollow glass spherical bodies obtained by the process, the particle density is at a level of at most 0.50 g/cm³, but the average particle size is at a level of 50 μm, and they are large spherical bodies.

Further, JP-B-4-37017 discloses a process for obtaining hollow glass microspheres by baking in a furnace impalpable powder having glass forming components and a foaming agent component supported by silica gel. With respect to physical properties of the hollow glass spherical bodies obtained by the process, the particle density is at a level of 0.3 g/cm³, and the average particle size is at a level of 70 μm.

However, with respect to the hollow glass spherical bodies obtained by such processes, although adequate hollowness to impart e.g. weight saving effects and heat insulating effects is obtained, the average particle size is at least about 50 μm, and particles exceeding 100 μm are contained as particles with maximum particle size. Accordingly, they cannot be used for applications for which smoothness on the surface is required, in fields of e.g. heat insulating coatings and SMC (sheet molding compound) for outer jacketing laggings of automobiles, or for applications in which the thickness of a composite material is restricted, including applications for lowering dielectric constant, such being problematic.

Further, along with broadening of the particle size distribution, the particle density of particles tends to be distributed in general. Large particles having a low particle density tend to have weak particle strength, whereby they are likely to fracture due to excess stress in the processing such as kneading, in applications for fillers for thermoplastic resins, and no adequate weight saving effects, heat insulating effects and dielectric constant-lowering effects can be obtained for intended purposes, such being problematic.

The present invention has been made to overcome the above problems, and it is an object of the present invention to provide hollow glass microspheres to obtain lightweight materials having excellent heat insulating properties and high strength when used as a filler for resins, for example, and to obtain coating films which are excellent also in smoothness when used as a filler for coatings. Specifically, it is an object of the present invention to provide hollow glass microspheres having micro particle sizes, a low particle density and grain size properties with a sharp grain size distribution, having a high homogeneity and being less likely to fracture during handling such as kneading or molding, which have not been obtained yet.

DISCLOSURE OF THE INVENTION

According to a first aspect of the present invention, there is provided hollow glass microspheres which have an average particle size of at most 15 μm (based on volume), a maximum particle size of at most 45 μm, a particle density of at most 0.5 g/cm³, a grain size gradient of at most 2.0 as represented by the following formula, and a $B_2O_3$ content contained in the glass of from 9.0 to 20.0 mass %:

grain size gradient=$(d_{10}-d_{90})/d_{50}$ wherein $d_{10}$, $d_{50}$ and $d_{90}$ are particle sizes with which values of volume-based oversize particle cumulative distribution become 10%, 50% and 90%, respectively, as measured by a laser scattering type grain size measuring apparatus.

As preferred embodiments of the present invention, of the hollow glass microspheres, the particle density is at most 0.4 g/cm³, the grain size gradient is at most 1.0, the average particle size is at most 10 μm, and the maximum particle size is at most 30 μm.

Further, as another preferred embodiment of the present invention, the $B_2O_3$ content contained in the glass is from 10.0 to 15.0 mass %.

According to a second aspect of the present invention, there is provided a process for producing the above hollow glass microspheres, which comprises adding a flammable liquid to a glass preparing blend containing a foaming component, followed by wet grinding to prepare a slurry of the glass preparing blend having an average particle size of at most 3 μm, atomizing said slurry from a two-fluid nozzle under a gas pressure of from 0.2 to 2 MPa to form droplets containing the glass preparing blend, heating them to obtain hollow glass microspheres, and as the case requires, carrying out a classification treatment to bring the particle sizes to be less than 45 μm.

According to a third aspect of the present invention, there is provided a process for producing the above hollow glass microspheres, which comprises adding a flammable liquid to a glass preparing blend containing a foaming component, followed by wet grinding to prepare a slurry of the glass preparing blend having an average particle size of at most 3 μm, atomizing said slurry while applying a pressure of from 0.1 to 8 MPa to form droplets containing the glass preparing blend, heating them to obtain hollow glass microspheres, and as the case requires, carrying out a classification treatment to bring the particle sizes to be less than 45 μm.

BEST MODE FOR CARRYING OUT THE INVENTION

In the present invention, as mentioned above, with respect to particle properties and grain size properties as hollow glass microspheres, the average particle size is at most 15 μm, the maximum particle size is at most 45 μm, the particle density is at most 0.5 g/cm$^3$, and the grain size gradient is at most 2.0 as mentioned hereinafter.

In the present invention, the average particle size is based on volume (the same applies hereinafter), and the particle size can be measured by a laser scattering type grain size measuring apparatus.

If the average particle size of the hollow glass microspheres exceeds 15 μm, or the maximum particle size exceeds 45 μm, the homogeneity tends to be impaired, the microspheres are likely to fracture during handling such as kneading or molding, whereby no great strength can be imparted, and also smoothness on the surface tends to be impaired when used as SMC for outer jacketing laggings of automobiles or as a filler for coatings. Further, when used as fillers for low-dielectric constant multi-layer circuit boards, an insulating layer tends to be too thick, such being unfavorable.

Here, the average particle size and the maximum particle size may be as small as possible within a range where hollow particles can be maintained. However, if they are too small, there is a possibility that they undergo agglomeration when mixed with a resin, whereby no uniform dispersion state can be achieved, such being unfavorable. Preferably, the average particle size is from 3 to 10 μm, and the maximum particle size is at most 10 μm.

Further, if the particle density exceeds 0.5 g/cm$^3$, they tend to be too heavy, whereby no weight saving effects tend to be obtained, and further, no adequate heat insulating effects and dielectric constant-lowering effects tend to be obtained. A preferred particle density is at most 0.4 g/cm$^3$. Here, in the present invention, the particle density is a value obtained by dividing mass (g) of the particles by the appearant volume (outer shape, cm$^3$) of the particles, and can be measured by a dry automatic densimeter.

In the present invention, the grain size gradient is at most 2.0. The grain size gradient is a value obtained by a formula $(d_{10}-d_{90})/d_{50}$ wherein $d_{10}$, $d_{50}$ and $d_{90}$ are particle sizes with which values of volume-based oversize particle cumulative distribution become 10%, 50% and 90%, respectively, as measured by a laser scattering type grain size measuring apparatus (the same applies hereinafter).

If the grain size gradient exceeds 2.0, as in the case where the average particle size exceeds 15 μm the homogeneity tends to be impaired, and they are likely to fracture during handling such as kneading or molding, whereby no great strength tends to be imparted, and also smoothness on the surface tends to be impaired when used as SMC for outer jacketing laggings of automobiles or a filler for coatings. Further, when used as a filler for low-dielectric constant multi-layer circuit boards, an insulating layer tends to be too thick, such being unfavorable. A preferred grain size gradient of the hollow glass microspheres is at most 1.0.

Further, in the present invention, such hollow glass microspheres contain $B_2O_3$ in an amount of from 9 to 20 mass % (the same applies hereinafter) in the glass composition. By blending glass materials to bring the hollow glass microspheres to contain $B_2O_3$ in such a range, and by employing the process of the present invention as explained hereinafter, it becomes possible to obtain hollow glass spherical bodies which are micro and yet have a low density.

As a well-known glass having a $B_2O_3$ content to such an extent, borosilicate glass is mentioned, which is a glass containing $SiO_2$—$B_2O_3$—$Na_2O$ as the main component, popularly used for physical and chemical equipments, and excellent also in heat resistance. Further, borosilicate glass has a high strength and a low alkali elusion degree, and is extremely suitable as a substrate of the hollow glass microspheres. Here, as a typical composition of borosilicate glass, $SiO_2$ is from 60 to 80%, $B_2O_3$ is from 9 to 20%, $Na_2O$ is from 3 to 15%, CaO is from 5 to 15%, and $Al_2O_3$ is from 0 to 5%.

Further, with respect to the $B_2O_3$-containing glass of the present invention, another component may further be added based on the composition so as to improve physical properties, or one having $B_2O_3$ in a required amount incorporated in a glass having a composition different from borosilicate glass may be used. For example, high-silica glass containing $SiO_2$—$B_2O_3$ as the main component or glass having a non-alkali composition containing $SiO_2$—$Al_2O_3$—$B_2O_3$—CaO—MgO as the main component may be mentioned.

$B_2O_3$ in itself becomes a network-forming component of glass, but it has a melting point of so low as 450° C., and in the present invention, a part of $B_2O_3$ (including as B) molten at a temperature at which it is treated in production of hollow glass microspheres, tends to take a foaming component and/or blowing gas therein. It is considered that due to the effect by preventing escape of the blowing gas, there is an effect of decreasing the particle density even if the particles are micro, despite the fact that hollow particles having small particle sizes in themselves are less likely to foam, and even if they foam, the particle density is less likely to decrease.

In the present invention, if the $B_2O_3$ content is less than 9 mass %, no effect to obtain micro and low-particle density hollow glass spherical bodies tends to be obtained, and on the contrary, if the $B_2O_3$ content is excessive, chemical durability tends to decrease. Accordingly, the upper limit is required to be at most 20 mass %, and a preferred content is from 10 to 15 mass %.

Now, a preferred process for producing such hollow glass microspheres will be explained below.

A glass preparing blend is one which undergoes vitrification by heating, and a plurality of different materials are blended in a proportion to obtain a desired glass composition in general. The glass material may, for example, be silica sand, volcanic ash, perlite, fluolite, obsidian, silica gel, zeolite, bentonite, soda ash, borax, boric acid, zinc flower, lime, $Ca_3(PO_4)_2$, $Na_2SO_4$, $Na_4P_2O_7$, $Al_2O_3$, a compound or a salt which derives a glass forming component such as $SiO_2$, $B_2O_3$ or $Na_2O$. Among them, a $B_2O_3$ source such as borax or boric acid is essential.

Further, as a glass preparing blend, a glass powder obtained by pulverizing glass cullet obtained by preliminarily melting in a hot melt furnace a plurality of materials in predetermined amounts to obtain a desired glass composition, followed by cooling, can also be used suitably.

In the glass preparing blend, a foaming component is contained. The foaming component generates gas when the glass preparing blend undergoes vitrification by heating and becomes spherical, and has an effect to make the vitrified molten glass to be hollow bodies.

The foaming component may, for example, be sulfate, carbonate, nitrate, acetate or crystallization water of sodium, potassium, lithium, calcium, magnesium, barium, aluminum or zinc. It is important to control the foaming component and its content so as to obtain the grain size and the particle properties of the present invention. In a case of a sulfate, for example, it is contained in an amount of preferably from 1 to 20 mass % as calculated as $SO_3$ in the glass preparing blend. If it is at most 1 mass %, foaming tends to be inadequate, and the particle density tends to be so high as at least 0.5 g/cm$^3$, whereby no desired particle density tends to be obtained, such being unfavorable. On the contrary, if it is at least 20 mass %, the amount of the blowing gas tends to be too large, whereby the gas tends to be discharged outside without being retained in the inside of the particles, and as a result, no hollow particles tend to be obtained, such being unfavorable.

Such glass preparing blend is subjected to wet grinding. As a liquid to be used for the wet grinding, it is preferred to use a flammable liquid, particularly the same one as a liquid in a slurry during atomization and combustion, whereby production steps can be simplified. It is preferred to adjust the amount of the liquid so that the concentration of the glass preparing blend in the liquid during the wet grinding step is the same as the concentration of the glass preparing blend in the slurry during atomization, whereby production steps can be simplified.

A wet grinder to be used is preferably a medium-stirring mill represented by a ball mill or a beads mill in view of its fine-grinding performances, but another wet grinder may also be used. Contamination by a material of the grinder will cause decrease in the yield of the hollow glass microspheres, and accordingly, it is preferred to select as a material for a part to be in contact with the liquid, one which is less likely to be worn out, such as alumina, zirconia or alumina/zirconia composite ceramics, or a material having the same composition as some of the glass preparing blends.

The average particle size of the glass preparing blend after the wet grinding is required to be at most 3 μm, so as to efficiently obtain hollow glass microspheres having desired grain size properties and particle properties such as the average particle size and the particle size gradient, and to obtain hollow glass microspheres having a uniform composition.

A dispersing agent or a dispersion stabilizer may be added for dispersion and dispersion stabilization of the slurry. As the dispersing agent, a nonionic surface active agent, a cationic surface active agent, an anionic surface active agent or a high polymer surface active agent may, for example, be used, and among them, a high polymer anionic surface active agent is particularly preferred. For example, an acid-containing oligomer such as an acid-containing acryl oligomer which is a copolymer of an acrylic acid with an acrylic ester, and which has a high acid value at a level of from 5 to 100 mgKOH/g, is preferred. Such a high polymer anionic surface active agent is favorable since it not only contributes to dispersion and dispersion stabilization of the slurry but also suppresses the viscosity of the slurry to be low.

In a case where the glass preparing blend thus obtained does not have a predetermined concentration as the slurry, the liquid may be added to make up a shortfall so that the glass preparing blend has a predetermined concentration. The concentration of the glass preparing blend in the slurry is preferably from 5 to 50 mass %, more preferably from 10 to 40 mass %. If the concentration of the glass preparing blend in the slurry is less than 5 mass %, the unit of the flammable liquid forming the slurry tends to increase, such being unfavorable. On the contrary, if it exceeds 50 mass %, the viscosity of the slurry tends to increase, whereby handling tends to be inconvenient, and formation of droplets during atomization tends to be discouraged, such being unfavorable.

Then, the slurry is formed into droplets. There are two methods of forming droplets.

A first method of forming droplets is a method of using a two-fluid nozzle under a gas pressure of from 0.2 to 2 MPa to form droplets. In this case, if the gas pressure is less than 0.2 MPa, the particle sizes of the hollow microspheres tend to be too large, and ones having desired particle sizes can hardly be obtained. On the other hand, if the gas pressure exceeds 2 MPa, accidental fire of combustion flame may be caused, or the particle sizes of the formed hollow glass microspheres tend to be small, and accordingly the outer shell thickness tends to be extremely thin, the foaming component in the inside of the particles tends to escape outside the outer shell and the hollow part tends to decrease, whereby no desired particle density tends to be obtained. A preferred pressure is from 0.3 to 1.5 MPa.

As said gas, any of air, nitrogen, oxygen, carbon dioxide and the like may suitably be used. However, the oxygen concentration is preferably at most 30 vol % from a viewpoint to control the combustion temperature and to obtain hollow glass microspheres having good smoothness on the surface. This is to suppress combustion before droplets are formed, and to accelerate combustion after predetermined droplets are formed, regarding combustion of the flammable liquid forming the slurry in the atomization and granulation step.

A second method of forming droplets is a method of applying a pressure of from 0.1 to 8 MPa to the slurry for atomizing to form droplets. If the pressure is less than 0.1 MPa, the particle sizes of the hollow glass microspheres tend to be too large, and ones having desired particle sizes are hardly obtained. On the other hand, if the pressure exceeds 8 MPa, accidental fire of combustion flame may be caused, or the particle sizes of the formed hollow glass microspheres tend to be small, and accordingly the outer shell thickness tends to be extremely thin, the foaming component in the inside of the particles tends to escape outside the outer shell and a hollow part tends to decrease, whereby no desired particle density tends to be obtained. A preferred pressure is from 2 to 6 MPa.

In the formed droplets, the glass preparing blend is contained. With respect to the size of the droplets, if they are too large, combustion by heating tends to be unstable, or large particles are likely to form, such being unfavorable. On the other hand, if they are too small, the glass composition to be obtained tends to be non-uniform, and the yield of the hollow glass microspheres tends to decrease, such being unfavorable. A preferred size of the droplets is within a range of from 0.1 to 70 μm.

When the droplets are heated, the glass preparing blend is melted and vitrified, and at the same time, the foaming component in the glass is gasified, to form hollow glass microspheres.

As a heating means, every means including combustion and electric heating may be employed. The heating temperature depends on the temperature at which the glass preparing blend is vitrified. Specifically, it is within a range of from 300 to 1500° C. In the present invention, the liquid component in the slurry is a flammable liquid, and this undergoes combustion and generates heat to contribute to melting of the glass.

The hollow glass microspheres thus formed are recovered by a method using e.g. a cyclone, a bag filter, a scrubber or a packed tower. Then, a non-foaming product in the recovered powder is removed and a foaming product alone is recovered by a flotation method by means of water. In a case of selecting a foaming product having a low density, it is effective to employ a flotation method by means of e.g. an alcohol having a low specific gravity.

Then, a classification treatment is carried out to bring the maximum particle size to be at most 45 μm, and to obtain desired grain size properties as the case requires. The classification treatment is not particularly limited, but preferred is a method employing an air classifier or a wet or dry screen classifier.

The hollow glass microspheres produced by the above process have an average particle size of at most 15 μm and a grain size gradient of at most 2.0 as measured by a laser scattering type grain size measuring apparatus, and a particle density of at most 0.5 g/cm$^3$ as measured by a dry automatic densimeter, have an adequate hollowness to impart weight saving effects and heat insulating effects, and are extremely useful for applications for which high smoothness on the surface is required or applications in which the thickness of a composite material is restricted.

Further, with respect to particle strength, the disruptive strength is at a level of at least 50 MPa at 10% volume reduction based on volume by hydrostatic pressure when the particle density is 0.5 g/cm$^3$, and they have an adequate strength so that they hardly fracture during compound production and during injection molding, when used as a filler for thermoplastic resins. Further, the disruptive strength is at least 20 MPa at 10% volume reduction based on volume by hydrostatic pressure when the particle density is 0.4 g/cm$^3$, and the disruptive strength is at least 5 MPa at 10% volume reduction based on volume by hydrostatic pressure when particle density is 0.3 g/cm$^3$.

The hollow glass microspheres of the present invention are useful for the following applications. Namely, since they have excellent particle properties and grain size properties, have adequate particle strength and hardly fracture during processing, when used as a resin forming component such as SMC for outer jacketing laggings of automobiles or a filler for heat insulating coatings, an extremely smooth surface of a molded product of a resin or coated surface can be obtained, and at the same time, desired weight saving effects or heat insulating effects can be obtained. Further, they can be used widely for applications in which the thickness of a composite material is restricted, such as dielectric constant-lowering fillers.

The applications of the hollow glass microspheres of the present invention are not particularly limited to the above applications, and they are extremely useful in various fields including cement, mortar, synthetic wood, weight saving fillers for a metal or an alloy having a low melting point such as aluminum or magnesium, heat-insulating and weight saving fillers for building materials, sensitizing fillers for explosives, fillers for electrical insulating layers, sound-insulating fillers, fillers for cosmetics, filter media, blast media and spacers. Further, when mixed with large hollow glass spherical bodies of at least 20 μm, the present hollow glass microspheres can fill in the interspace among the large particles, whereby higher weight saving effects, heat insulating effects and dielectric constant-lowering effects can be obtained.

According to the present invention, hollow glass microspheres which are micro and have a low density, and of which the particle sizes are uniform, can be obtained. This is considered to be because the size of the droplets tends to be uniform, one drop of droplet forms one hollow glass microsphere, and each droplet undergoes combustion to generate combustion gas, whereby agglomeration of particles is prevented. Further, it is considered that the $B_2O_3$ component in collaboration with the production process makes it possible to obtain such hollow glass microspheres.

EXAMPLES

Example 1 (Working Example)

17.5 g of silicon dioxide, 4.5 g of calcium carbonate, 7.8 g of borax, 1.0 g of dibasic calcium phosphate, 0.6 g of sodium sulfate, 0.4 g of potassium carbonate and 1.6 g of a dispersing agent (Homogenol L-1820, manufactured by Kao Corporation, the same applies hereinafter) were mixed to obtain a glass preparing blend, which was subjected to wet grinding by using a ball mill to obtained a slurry of the glass preparing blend.

The ball mill used was a bench type ball mill having an internal volume of 500 cc, and having about 250 cc of alumina balls of from 10 to 15 mmΦ put therein. Into the ball mill, the above glass preparing blend and 150 g of coal oil were put, followed by wet grinding at 100 rpm for 20 hours, to obtain a slurry of the glass preparing blend. The glass preparing blend was recovered from the obtained slurry of the glass preparing blend, and the average particle size was measured by using a laser scattering type grain size measuring apparatus (Microtrack HRA, Model 9320-X100, manufactured by Nikkiso Co., Ltd., the same applies hereinafter) and found to be 1.2 μm.

The obtained slurry of the glass preparing blend was formed into droplets by means of a two-fluid nozzle, flame was put to the droplets for combustion to conduct vitrification and to produce hollow glass microspheres. As the gas of the two-fluid nozzle, air was used, the pressure thereof was 0.4 MPa, and the size of the droplets formed was about 10 μm. Further, the amount of the combustion air during combustion was 1.1 times the theoretical amount of the air, and the combustion temperature was about 1100° C. The obtained particles were recovered by a bag filter, mixed with water and subjected to centrifugal separation to measure the water flotation ratio, and it was confirmed that about 37 mass % floated on water. Then, particles floating on water alone were recovered as a slurry, which was subjected to a vacuum filter to separate a solid matter and left to stand at 120° C. for drying, to obtain water-floating particles. The shape of the water-floating particles was observed by a scanning electron microscope, whereupon every particle was hollow and spherical.

Then, said water-floating particles were subjected to classification by a turbo screener having a polyester net with an opening of 24 μm set thereto (Model TS125x200, manufactured by Turbo Kogyo K.K., the same applies hereinafter), and sieved particles thus obtained were recovered.

The grain size of the sieved particles was measured by a laser scattering type grain size measuring apparatus, whereupon the average particle size (it was substantially the same as $d_{50}$ in the present Example) was 9.5 μm, the maximum particle size was 24 μm, and in the volume-based oversize particle cumulative distribution, $d_{10}$ was 17.5 μm, $d_π$ was 6.8 μm, and the grain size gradient was 1.126. Further, the particle density was 0.48 g/cm³ as measured by a dry automatic densimeter (Accupick 1330, manufactured by Shimadzu Corporation, the same applies hereinafter), and the yield was 30 mass %. Further, the disruptive strength was 66 MPa at 10% volume reduction based on volume by hydrostatic pressure.

Further, the obtained hollow glass microspheres were confirmed to be vitreous as a result of X-ray diffraction measurement. Further, the $B_2O_3$ content contained in the glass was measured by using ICP (inductively coupled plasma analyzing apparatus, Model ICPS-5000, manufactured by Shimadzu Corporation, the same applies hereinafter) and found to be 10.1 mass %.

Then, on the assumption that they are used for weight saving of an automobile, said hollow glass microspheres were added to polypropylene as a thermoplastic resin, to measure the weight saving effects and the impact strength of an injection-molded product. As a blank, the density and the Izod impact strength of an injection-molded product of polypropylene alone were measured, whereupon the density was 0.89 g/cm³, and the Izod impact strength was 8.5 kJ/m². On the other hand, 15 mass % of said hollow glass microspheres were added and the same measurements were carried out, whereupon the density was 0.78 g/cm³ and substantially the same as the theoretical value (0.79 g/cm³). Further, the Izod impact strength of the injection-molded product was 5.0 kJ/m², and showed a considerably high strength as a composite.

Example 2 (Working Example)

A slurry of a glass preparing blend obtained in the same manner as in Example 1 was formed into droplets by a two-fluid nozzle, and flame was put to the droplets for combustion, to conduct vitrification and to produce hollow glass microspheres. As the gas of the two-fluid nozzle, air was used, the pressure thereof was 0.3 MPa, and the size of the droplets thus formed was about 13 μm. Further, the amount of combustion air during combustion was 1.1 times the theoretical amount of the air, and the combustion temperature was about 1100° C.

The obtained particles were recovered by a bag filter, mixed with water and subjected to centrifugal separation to measure the water floatation ratio, and it was confirmed that about 45 mass % floated on water. Then, particles floating on water alone were recovered as a slurry, which was subjected to a vacuum filter to separate a solid matter and left to stand at 120° C. for drying, to obtain water-floating particles. The shape of the water-floating particles was observed by a scanning electron microscope, whereupon every particle was hollow and spherical.

Then, said water-floating particles were subjected to classification by a turbo screener having a polyester net with an opening of 42 μm set thereto, and sieved particles were recovered.

The grain size of the sieved particles was measured by a laser scattering type grain size measuring apparatus, whereupon the average particle size ($d_{50}$) was 12.0 μm, the maximum particle size was 40 μm, and in the volume-based oversize particle cumulative distribution, $d_{10}$ was 24.5 μm, $d_{90}$ was 6.9 μm, and the grain size gradient was 1.467. Further, the particle density was 0.38 g/cm³ as measured by a dry automatic densimeter, and the yield was 40 mass %. Further, the disruptive strength was 21 MPa at 10% volume reduction based on volume by hydrostatic pressure.

Further, the obtained hollow glass microspheres were confirmed to be vitreous as a result of X-ray diffraction measurement. Further, the $B_2O_3$ content contained in the glass was measured by using ICP and found to be 10.0 mass %.

Example 3 (Working Example)

85.0 g of silicon dioxide, 22.5 g of calcium carbonate, 18.2 g of boric acid, 5.0 g of dibasic calcium phosphate, 2.0 g of lithium carbonate, 6.7 g of sodium sulfate, 14.2 g of borax and 7.7 g of a dispersing agent were mixed with 600 g of coal oil, followed by wet grinding by using a medium stirring mill to obtain a slurry of a glass preparing blend.

The mill used was one having an internal volume of 1400 cc and made of zirconia. As beads, 1120 cc of zirconia balls having an average size of 0.65 mmΦ were put. As an operation condition, the rotational number was 2500 rpm, and wet grinding was conducted for 30 minutes. The glass preparing blend was recovered from the obtained slurry of the glass preparing blend, and the volume-based average particle size was measured by using a laser scattering type grain size measuring apparatus and found to be 0.8 μm.

The obtained slurry of the glass preparing blend was formed into droplets by a two-fluid nozzle, and flame was put thereto for combustion, to produce hollow glass spherical bodies in the same manner as in Example 1. Here, as the gas of the two-fluid nozzle, air was used, the pressure thereof was 0.6 MPa, and the size of the droplets was about 8 μm. Further, the amount of combustion air during combustion was 1.1 times the theoretical amount of the air, and the combustion temperature was about 1100° C. The obtained particles were recovered by a bag filter and mixed with water, and particles flowing on water were subjected to centrifugal separation, to measure the water floatation ratio, whereupon it was found that about 45 mass % floated on water. Then, particles floating on water alone were recovered as a slurry, which was subjected to a vacuum filter to separate a solid matter and left to stand at 120° C. for drying, to obtain water-floating particle. The shape of the water-floating particles was observed by a scanning electron microscope, whereupon every particle was hollow and spherical.

Then, in the same manner as in Example 1, said water-floating particles were subjected to classification by a turbo screener having a polyester net with an opening of 24 μm set thereto, and sieved particles were recovered. The grain size of the sieved particles was measured by a laser scattering type grain sizes measuring apparatus, whereupon the average particle size was 9.3 μm, the maximum particle size was 23 μm, and in the volume-based oversize particle cumulative distribution, $d_{10}$ was 13.1 μm, $d_{90}$ was 6.9 μm and the grain size gradient was 0.667. Further, the particle density of the particles floating on water was 0.38 g/cm³ as measured by a dry automatic densimeter, and the yield was 39 mass %.

The obtained particles were confirmed to be vitreous and hollow glass microspheres as a result of X-ray diffraction measurement. Further, the $B_2O_3$ content contained in the glass was measured by using ICP and found to be 10.6 mass %.

Example 4 (Working Example)

Hollow glass microspheres were obtained in the same manner as in Example 3 except that carbon dioxide was used as an atomizing gas of the two-fluid nozzle when the prepared slurry was atomized. The obtained particles were subjected to a classification treatment in the same manner as in Example 3, and the grain size of the sieved particles was measured by a laser scattering type grain size measuring apparatus, whereupon the average particle size was 8.1 μm, the maximum particle size was 22 μm, and in the volume-based oversize particle cumulative distribution, $d_{10}$ was 11.4 μm, $d_{90}$ was 6.2 μm, and the grain size gradient was 0.642. Further, the particle density of the particles floating on water was 0.35 g/cm$^3$ as measured by a dry automatic densimeter, and the yield was 44 mass %.

The obtained particles were confirmed to be vitreous and hollow glass microspheres as a result of X-ray diffraction measurement. Further, the disruptive strength was 20 MPa at 10% volume reduction based on volume by hydrostatic pressure. Further, the $B_2O_3$ content contained in the glass was measured by using ICP and found to be 10.5 mass %.

Example 5 (Working Example)

Pressure was applied to the slurry of the glass preparing blend obtained in Example 3 for atomization to form droplets containing the glass preparing blend, flame was put thereto for combustion to produce hollow glass spherical bodies. The pressure applied to the slurry was 4 MPa, and the size of the droplets during atomization was about 4.5 μm. Further, the amount of the combustion air during combustion was 1.1 times the theoretical amount of the air, and the combustion temperature was about 1100° C.

The obtained particles were recovered by a bag filter and mixed with water, and particles floating on water were subjected to centrifugal separation to measure the water floatation ratio, whereupon it was found that about 39 mass % floated on water. Then, the particles floating on water alone were recovered as a slurry, which was subjected to a vacuum filter to separate a solid matter and left to stand at 120° C. for drying, to obtain water-floating particles. The shape of the water-floating particles was observed by a scanning electron microscope, whereupon every particle was hollow and spherical.

Then, in the same manner as in Example 1, said water-floating particles were subjected to classification by a turbo screener having a polyester net with an opening of 17 μm set thereto, and sieved particles were recovered. The grain size of the sieved particles was measured by a laser scattering type grain size measuring apparatus, whereupon the average particle size was 7.8 μm, the maximum particle size was 15.5 μm, and in the volume-based oversize particle cumulative distribution, $d_{10}$ was 10.5 μm, $d_{90}$ was 4.8 μm, and the grain size gradient was 0.731. Further, the particle density of the sieved particles was 0.48 g/cm$^3$ as measured by a dry automatic densimeter, and the yield was 30 mass %.

Further, the obtained hollow glass microspheres were confirmed to be vitreous and hollow glass microspheres as a result of X-ray diffraction measurement. Further, the $B_2O_3$ content contained in the glass was measured by using ICP and found to be 10.2 mass %.

Example 6 (Comparative Example)

70.0 g of silicon dioxide, 12.9 g of sodium carbonate, 17.5 g of calcium carbonate, 26.7 g of boric acid, 1.1 g of zinc oxide, 0.5 g of aluminum oxide, 4.2 g of dibasic calcium phosphate, 2.7 g of lithium carbonate, 1.6 g of potassium carbonate, 1.3 g of sodium sulfate and 6.9 g of a dispersing agent were mixed with 600 g of coal oil, followed by wet grinding by using a sand mill to obtain a slurry of a glass preparing blend.

The sand mill and beads were the same as those in Example 3, and the operation condition was the same also. The glass preparing blend was recovered from the obtained slurry of the glass preparing blend, and the volume-based average particle size was measured by using a laser scattering type grain size measuring apparatus, and found to be 0.5 μm.

The obtained slurry of the glass preparing blend was atomized by a two-fluid nozzle, flame was put thereto for combustion, to conduct vitrification and to produce hollow glass microspheres. Here, air was used as the gas of the two-fluid nozzle, the pressure thereof was 0.15 MPa, and the size of the droplets was about 20 μm. Further, the amount of the combustion air during combustion was 1.2 times the theoretical amount of the air, and the combustion temperature was about 1000° C. The obtained particles were recovered by a bag filter, mixed with water and subjected to centrifugal separation to measure the water floatation ratio, whereupon it was confirmed that about 65 mass % floated on water.

Then, particles floating on water alone were recovered as a slurry, which was subjected to a vacuum filtrater to separate a solid matter and left to stand at 120° C. for drying, to obtain water-floating particles. The shape of the water-floating particles was observed by a scanning electron microscope, whereupon every particle was spherical.

With respect to the grain size of said water-floating particles as measured by using a laser scattering type grain size measuring apparatus, the average particle size was 9.5 μm, but in the volume-based oversize particle cumulative distribution, $d_{10}$ was 26 μm, $d_{90}$ was 4.5 μm, and the grain size gradient was 2.263.

Further, as observed by a scanning electron microscope, it was confirmed that large hollow glass spherical bodies at a level of from 40 to 50 μm were contained. The particle density of the particles floating on water was 0.50 g/cm$^3$ as measured by a dry automatic densimeter. Further, for reference, said water-floating particles were subjected to classification by a turbo screener having a polyester net with an opening of 24 μm set thereto in the same manner as in Example 1, and sieved particles were recovered to measure the particle density, whereupon it was 0.62 g/cm$^3$. Further, the obtained particles were confirmed to be vitreous and hollow glass spherical bodies as a result of X-ray diffraction measurement.

Then, on the assumption that they are used for weight saving of an automobile, 15 mass % of said hollow glass microspheres floating on water were added to polypropylene having the same density and Izod impact strength of an injection-molded product as in Example 1 by itself, in the same manner as in Example 1, to measure the weight saving effects and the impact strength of an injection-molded product, whereupon the density was 0.81 g/cm$^3$ and substantially the same as the theoretical value (0.80 g/cm$^3$), but the Izod impact strength of the injection-molded product was so low as 1.7 kJ/m$^2$, such being unuseful practically.

Example 7 (Comparative Example)

17.5 g of silicon dioxide, 6.7 g of boric acid, 8.6 g of sodium sulfate and 1.6 g of a dispersing agent were mixed with 150 g of coal oil, followed by wet grinding by using a ball mill to obtain a slurry of a glass preparing blend.

The ball mill and the balls were the same as those in Example 1. The above slurry of the glass preparing blend was put therein, and wet grinding was carried out for 6 hours under an operation condition of the rotation number of 100 rpm. The glass preparing blend was recovered from the obtained slurry of the glass preparing blend, and the average particle size was measured by using a laser scattering type grain size measuring apparatus, whereupon it was 3.5 μm.

The obtained slurry of the glass preparing blend was atomized by a two-fluid nozzle, and flame was put thereto for combustion to conduct vitrification and to produce hollow glass spherical bodies. Here, as the gas of the two-fluid nozzle, air was used, the pressure thereof was 0.15 MPa, and the size of the droplets was about 30 μm. Further, the amount of the combustion air during atomization combustion was 1.2 times the theoretical amount of the air, and the combustion temperature was about 1000° C. The obtained particles were recovered by a bag filter, mixed with water and subjected to centrifugal separation to measure the water floatation ratio, whereupon it was confirmed that about 40 mass % floated on water.

Then, particles floating on water alone were recovered as a slurry, which was subjected to a vacuum filter to separate a solid matter and left to stand at 120° C. for drying, to obtain water-floating particles. The shape of the water-floating particles was observed by a scanning electron microscope, whereupon every particle was spherical.

The grain size of said water-floating particles was measured by using a laser scattering type grain size measuring apparatus, whereupon the average particle size was 19 μm, and in the volume-based oversize particle cumulative distribution, $d_{10}$ was 45 μm, $d_{90}$ was 11 μm, and the grain size gradient was 1.789. Further, as measured by a scanning electron microscope, it was proved that large hollow glass spherical particles at a level of from 40 to 50 μm were contained. The particle density of the particles floating on water was 0.65 g/cm$^3$ as measured by a dry automatic densimeter. For reference, said water-floating particles were subjected to classification by a turbo screener having a polyester net with an opening of 24 μm set thereto in the same manner as in Example 1, and sieved particles were recovered to measure the particle density, whereupon it was 0.75 g/cm$^3$.

The obtained particles were confirmed to be vitreous as a result of X-ray diffraction measurement. Then, on the assumption that they are used for weight saving of an automobile, 15 mass % of said hollow glass microspheres floating on water was added to polypropylene having the same density and Izod impact strength of an injection-molded product as in Example 1 by itself, in the same manner as in Example 1, to measure the weight saving effects and the impact strength of an injection-molded product, whereupon the density was 0.89 g/cm$^3$, and the Izod impact strength was 8.5 kJ/m$^2$. On the other hand, 15 mass % of said hollow glass spherical bodies was added and the same measurements were carried out, whereupon the density was 0.84 g/cm$^3$ and the same as the theoretical value (0.84 g/cm$^3$), but the Izod impact strength of an injection-molded product was so low as 2.3 kJ/m$^2$, such being unuseful practically.

Example 8 (Comparative Example)

17.5 g of silicon dioxide, 4.5 g of calcium carbonate, 7.8 g of borax, 1.0 g of dibasic calcium phosphate, 0.6 g of sodium sulfate, 0.4 g of potassium carbonate and 1.6 g of a dispersing agent were mixed to obtain a glass preparing blend, which was subjected to wet grinding by using a ball mill to obtain a slurry of a glass preparing blend.

The ball mill and balls were the same as those in Example 1. The above glass preparing blend and 150 g of coal oil were put therein, followed by wet grinding at 50 rpm for 4 hours to obtain a slurry of a glass preparing blend. The glass preparing blend was recovered from the obtained glass preparing blend slurry, and the volume-based average particle size was measured by using a laser scattering type grain size measuring apparatus and found to be 27.5 μm.

The obtained slurry of the glass preparing blend was formed into droplets by a two-fluid nozzle, and flame was put thereto for combustion to conduct vitrification and to produce hollow glass spherical bodies. Here, as the gas of the two-fluid nozzle, air was used, the pressure thereof was 0.15 MPa, and the size of the droplets was about 60 μm. The obtained particles were recovered by a bag filter, mixed with water and subjected to centrifugal separation to measure the water floatation ratio, whereupon it was confirmed that about 58 mass % floated on water. Then, particles floating on water alone were recovered as a slurry, which was subjected to a vacuum filter to separate a solid matter and left to stand at 120° C. for drying, to obtain water-floating particles. The shape of the water-floating particles was observed by a scanning electron microscope, whereupon every particle was spherical.

The grain size of said water-floating particles was measured by using a laser scattering type grain size measuring apparatus, whereupon the average particle size was 52 μm, and in the volume-based oversize particle cumulative distribution, $d_{10}$ was 88 μm, $d_{90}$ was 24 μm, and the grain size gradient was 1.231. The particle density of the particles floating on water was 0.36 g/cm$^3$ as measured by a dry automatic densimeter.

Further, the obtained particles were confirmed to be vitreous and hollow glass spherical bodies as a result of X-ray diffraction measurement.

Then, on the assumption that they are used for weight saving of an automobile, said hollow glass microspheres floating on water were added to polypropylene to examine weight saving effects in the same manner as in Example 1. As a blank, the density of the polypropylene alone was measured and found to be 0.89 g/cm$^3$. On the other hand, 15 mass % of said hollow glass spherical bodies was added to conduct the same measurement, whereupon the density was 0.84 g/cm$^3$ and significantly high as compared with the theoretical value (0.73 g/cm$^3$). This is considered to be because some of the hollow glass microspheres fractured during processing such as kneading. Since the density of the glass is 2.4 g/cm$^3$, it is estimated that about 55% of said hollow glass microspheres fractured.

Example 9 (Comparative Example)

91.5 g of silicon dioxide, 29.4 g of calcium carbonate, 7.8 g of boric acid, 6.5 g of dibasic calcium phosphate, 2.6 g of lithium carbonate, 15.7 g of sodium sulfate and 7.7 g of a dispersing agent were mixed with 600 g of coal oil, followed by wet grinding by using a medium stirring mill to obtain a slurry of a glass preparing blend.

The mill and beads were the same as those in Example 3, and the operation condition was the same as in Example 3. The glass preparing blend was recovered from the obtained slurry of the glass preparing blend, and the volume-based average particle size was measured by using a laser scattering type grain size measuring apparatus and found to be 1.1 μm.

The obtained slurry of the glass preparing blend was formed into droplets by a two-fluid nozzle in the same manner as in Example 1, and flame was put thereto for combustion to produce hollow glass spherical bodies. Here, as the gas of the two-fluid nozzle, air was used, the pressure thereof was 0.6 MPa, and the size of the droplets was about 8 μm. Further, the amount of the combustion air during combustion was 1.1 times the theoretical amount of the air, and the combustion temperature was about 1100° C. The obtained particles were recovered by a bag filter and mixed with water, and particles floating on water were subjected to centrifugal separation to measure the water floatation ratio, whereupon it was confirmed that about 45 mass % floated on water. Then, the particles floating on water alone were recovered as a slurry, which was subjected to a vacuum filter to separate a solid matter and left to stand at 120° C., followed by drying, to obtain water-floating particles. The shape of the water-floating particles was observed by a scanning electron microscope, whereupon every particle was spherical.

Then, in the same manner as in Example 1, said water-floating particles were subjected to classification by a turbo screener having a polyester net with an opening of 24 μm set thereto, and sieved particles were recovered.

The grain size of the sieved particles was measured by a laser scattering type grain size measuring apparatus, whereupon the average particle size was 7.3 μm, and in the volume-based glass sieve integrated distribution, $d_{10}$ was 12.6 μm, $d_{90}$ was 5.2 μm, and the grain size gradient was 1.014. Further, the particle density of the particles floating on water was 0.82 g/cm$^3$ as measured by a dry automatic densimeter.

The obtained particles were confirmed to be vitreous and hollow glass microspheres as a result of X-ray diffraction measurement. Further, the $B_2O_3$ content contained in the glass was measured and found to be 3.2 mass %.

Industrial Applicability

The hollow glass microspheres of the present invention have such particle properties that the particle sizes are micro and the particle density is low and such grain size properties that the grain size distribution is sharp, have a high homogeneity and have such strength that they are less likely to fracture during processing such as handling. Accordingly, when used as a resin forming component such as SMC for outer jacketing laggings of automobiles or a filler for heat-insulating coatings, an extremely smooth surface of a resin molded product or coated surface can be obtained, and at the same time, desired weight saving effects and/or heat insulating effects can be obtained in various applications including the above applications.

Further, it is possible to make resin layers thin, and accordingly they can be used widely also for applications in which the thickness of a composite material is restricted, such as dielectric constant-lowering fillers.

What is claimed is:

1. Hollow glass microspheres which have an average particle size of at most 15 μm (based on volume), a maximum particle size of at most 45 μm, a particle density of at most 0.5 g/cm$^3$, a grain size gradient of at most 2.0 as represented by the following formula, and a $B_2O_3$ content contained in the glass of from 9.0 to 20.0 mass %:

$$\text{grain size gradient}=(d_{10}-d_{90})/d_{50}$$

wherein $d_{10}$, $d_{50}$ and $d_{90}$ are particle sizes with which values of volume-based oversize particle cumulative distribution become 10%, 50% and 90%, respectively, as measured by a laser scattering type grain size measuring apparatus.

2. The hollow glass microspheres according to claim 1, wherein the particle density is at most 0.4 g/cm$^3$.

3. The hollow glass microspheres according to claim 1 or 2, wherein the grain size gradient is at most 1.0.

4. The hollow glass microspheres according to any one of claims 1 to 3, wherein the average particle size is at most 10 μm, and the maximum particle size is at most 30 μm.

5. The hollow glass microspheres according to any one of claims 1 to 4, wherein the $B_2O_3$ content contained in the glass is from 10.0 to 15.0 mass %.

6. A process for producing the hollow glass microspheres as defined in any one of claims 1 to 5, which comprises adding a flammable liquid to a glass preparing blend containing a foaming component, followed by wet grinding to prepare a slurry of the glass preparing blend having an average particle size of at most 3 μm, atomizing said slurry from a two-fluid nozzle under a gas pressure of from 0.2 to 2 MPa to form droplets containing the glass preparing blend, heating them to obtain hollow glass microspheres, and as: the case requires, carrying out a classification treatment to bring the particle sizes to be less than 45 μm.

7. A process for producing the hollow glass microspheres as defined in any one of claims 1 to 5, which comprises adding a flammable liquid to a glass preparing blend containing a foaming component, followed by wet grinding to prepare a slurry of the glass preparing blend having an average particle size of at most 3 μm, atomizing said slurry while applying a pressure of from 0.1 to 8 MPa to form droplets containing the glass preparing blend, heating them to obtain hollow glass microspheres, and as the case requires, carrying out a classification treatment to bring the particle sizes to be less than 45 μm.

* * * * *